(12) United States Patent
Colombet et al.

(10) Patent No.: US 11,954,171 B2
(45) Date of Patent: Apr. 9, 2024

(54) FRUSTRATION SCORES FOR FLOWS, PAGE VIEWS, WEBPAGES, SESSIONS, AND WEBSITES

(71) Applicant: Content Square SAS, Paris (FR)

(72) Inventors: Vincent Colombet, Paris (FR); Victor Cojocaru, Paris (FR); Hui Wang, Paris (FR); Sihem Abdoun, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/387,374

(22) Filed: Nov. 6, 2023

(65) Prior Publication Data

US 2024/0070220 A1    Feb. 29, 2024

Related U.S. Application Data

(63) Continuation of application No. 18/098,934, filed on Jan. 19, 2023, now Pat. No. 11,841,919.

(Continued)

(51) Int. Cl.
*G06F 17/00*    (2019.01)
*G06F 16/957*   (2019.01)
*G06F 16/958*   (2019.01)

(52) U.S. Cl.
CPC ........ *G06F 16/958* (2019.01); *G06F 16/9577* (2019.01)

(58) Field of Classification Search
CPC .................... G06F 16/958; G06F 16/9577
See application file for complete search history.

(56) References Cited

U.S. PATENT DOCUMENTS 7,584,435 B2 * 9/2009 Bailey ................... G06F 16/958
                                                    715/764
7,941,525 B1 * 5/2011 Yavilevich .............. H04L 67/02
                                                    709/224

(Continued)

OTHER PUBLICATIONS

U.S. Appl. No. 18/098,934 U.S. Pat. No. 11,841,919, filed Jan. 19, 2023, Frustration Scores for Flows, Page Views, Webpages, Sessions, and Websites.

(Continued)

*Primary Examiner* — Mohammed H Zuberi
(74) *Attorney, Agent, or Firm* — Schwegman Lundberg Woessner, P.A.

(57) ABSTRACT

Method of generating frustration score starts with processor receiving data associated with interactions by users with website including webpages displayed during sessions. Processor generates page view scores based on page view experience indicators and zone experience indicators associated with the webpages, generates session scores based on the page view scores and session experience indicators, and generates webpage scores based on page view scores. Processor identifies the webpage associated with highest level of frustration based on page view and webpage scores and identifies the session that is associated with highest level of frustration based on the session scores. Processor causes a user interface to be displayed on a display device that includes a visualization of interactions by a user with the website associated with the session with the highest level of frustration and an identification of the webpage associated with the highest level of frustration. Other embodiments are described herein.

20 Claims, 8 Drawing Sheets

Related U.S. Application Data

(60) Provisional application No. 63/301,788, filed on Jan. 21, 2022.

(56) References Cited

U.S. PATENT DOCUMENTS

| | | | |
|---|---|---|---|
| 9,508,081 | B2 | 11/2016 | Yavilevich |
| 9,882,999 | B1 * | 1/2018 | Xu .................... G06N 20/00 |
| 10,749,976 | B2 | 8/2020 | Yavilevich |
| 11,258,870 | B1 | 2/2022 | Yavilevich |
| 11,343,338 | B2 * | 5/2022 | Dille ................. G06F 11/3476 |
| 11,343,339 | B1 | 5/2022 | Yavilevich |
| 11,379,293 | B1 * | 7/2022 | Sun .................... G06N 5/04 |
| 11,516,305 | B2 | 11/2022 | Yavilevich |
| 11,789,805 | B2 * | 10/2023 | Ciabarra, Jr. ....... G06F 11/3419 714/37 |
| 2008/0189408 | A1 * | 8/2008 | Cancel ................. G06Q 30/02 709/224 |
| 2011/0119267 | A1 * | 5/2011 | Forman ................ G06Q 10/00 707/750 |
| 2015/0309910 | A1 * | 10/2015 | Cook .................... H04L 67/535 709/224 |
| 2016/0191554 | A1 * | 6/2016 | Kaminsky ........... H04L 63/1425 726/23 |
| 2016/0267520 | A1 * | 9/2016 | Kalish ................ G06Q 30/0272 |
| 2016/0267525 | A1 * | 9/2016 | Lin .................... G06Q 30/0246 |
| 2017/0139802 | A1 * | 5/2017 | Hajiyev .............. G06F 16/4387 |
| 2017/0285755 | A1 * | 10/2017 | Churchill ............ G06N 5/04 |
| 2018/0039530 | A1 * | 2/2018 | Ciabarra, Jr. ........ G06F 11/006 |
| 2018/0240145 | A1 * | 8/2018 | Zargham ............ G06Q 30/0226 |
| 2019/0007506 | A1 * | 1/2019 | Xu .................... G06F 16/24578 |
| 2019/0213612 | A1 * | 7/2019 | Maugans, III ........ G06Q 20/20 |
| 2019/0260818 | A1 * | 8/2019 | Ciabarra, Jr. .......... H04L 67/02 |
| 2019/0294642 | A1 * | 9/2019 | Matlick ................ G06F 16/958 |
| 2020/0097981 | A1 * | 3/2020 | Teo .................... G06Q 30/016 |
| 2021/0176294 | A1 * | 6/2021 | Ciabarra, Jr. ........... G06F 11/36 |
| 2022/0027430 | A1 | 1/2022 | Wang et al. |
| 2022/0027827 | A1 * | 1/2022 | Flacher ................ G06Q 10/10 |
| 2022/0131769 | A1 * | 4/2022 | Dille ................... G06F 11/3409 |
| 2022/0245013 | A1 * | 8/2022 | Ciabarra, Jr. ....... G06F 11/0778 |
| 2022/0279032 | A1 * | 9/2022 | Ciabarra, Jr. .......... H04L 67/02 |
| 2022/0353345 | A1 * | 11/2022 | Dille ................... G06F 11/3476 |
| 2023/0237120 | A1 | 7/2023 | Colombet et al. |
| 2023/0396688 | A1 * | 12/2023 | Dille .................... H04L 67/75 |
| 2023/0401122 | A1 * | 12/2023 | Ciabarra, Jr. ....... G06F 11/3419 |

OTHER PUBLICATIONS

"U.S. Appl. No. 18/098,934, Non Final Office Action dated Apr. 13, 2023", 14 pgs.

"U.S. Appl. No. 18/098,934, Notice of Allowance dated Aug. 4, 2023", 8 pgs.

"U.S. Appl. No. 18/098,934, Response filed Jul. 13, 2023 to Non Final Office Action dated Apr. 13, 2023", 17 pgs.

"International Application Serial No. PCT/IB2023/050488, International Search Report dated Mar. 23, 2023", 3 pgs.

"International Application Serial No. PCT/IB2023/050488, Written Opinion dated Mar. 23, 2023", 7 pgs.

Simon, Scheurer, "User experience score—the one metric to rule them all", via wayback machine, [Online] Retrieved from the Internet: <URL: https://web.archive.org/web/20211027051427/https://www.dynatrace.com/news/blog/user-experience-score-the-one-metric-to-rule-them-all/>, (Oct. 27, 2021), 1-10.

* cited by examiner

FRUSTRATION SCORES FOR FLOWS, PAGE VIEWS, WEBPAGES, SESSIONS, AND WEBSITES

CLAIM OF PRIORITY

This Application is a continuation of U.S. application Ser. No. 18/098,934, filed Jan. 19, 2023, which claims the benefit of U.S. Provisional Application Ser. No. 63/301,788, filed Jan. 21, 2022, which is hereby incorporated by reference in its entirety.

BACKGROUND

Electronic commerce (e-commerce) facilitates trillions of dollars in transactions yearly. Using their personal electronic devices, users can quickly and easily access a business' website or mobile application to purchase goods or services directly from the business.

It is imperative to understand the online customers' digital behaviors and gather insights therefrom. For example, the digital behaviors can include the navigational patterns of the user to the website or within the website as well as interactions with the elements displayed on the website. Improving the online customers' digital experience on the website will directly leads to increased sales and revenue growth from website or mobile application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

To understand the online customers' digital behaviors, the online customer's digital interactions on the webpage needs to be tracked and analyzed. Among other things, embodiments of the present disclosure improve the functionality of digital experience tracking systems by generating frustration scores for each of the webpages included in the business' website. Frustration scores can also be generated for the customers' sessions on the webpage as well as an overall frustration score associated with the business' website as a whole. By providing frustration scores at different levels of granularity, a business can quickly identify the specific causes of friction or frustration within their website that is affecting the customers' user experience and ultimately, costing the business loss of revenue.

Networked Computing Environment

Figure 1:
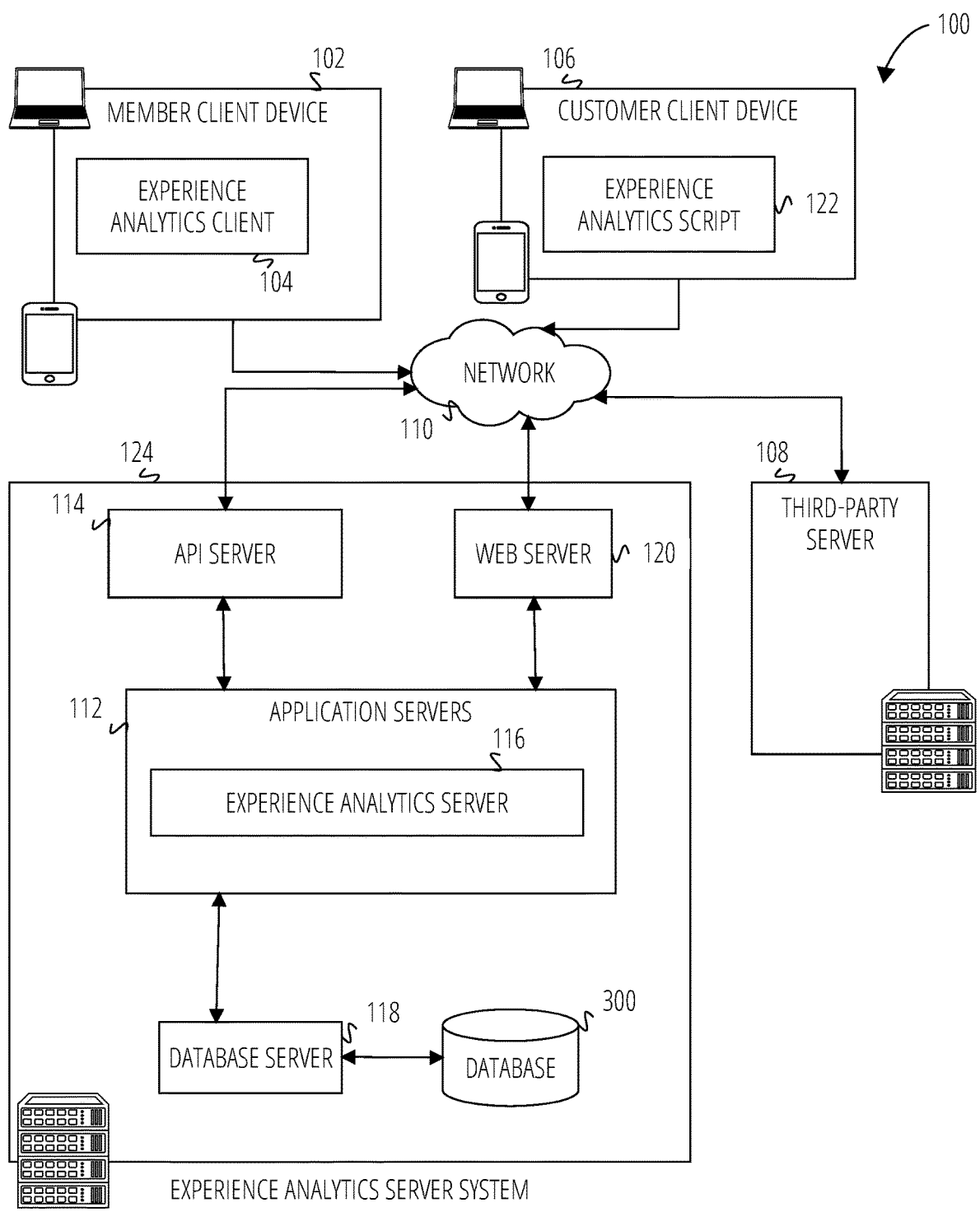
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning, and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning, and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning, and overlays to be applied on the website, etc. Other processor and memory intensive processing of data may also be performed server-side by the experience analytics server 116, in view of the hardware requirements for such processing.

System Architecture

Figure 2:
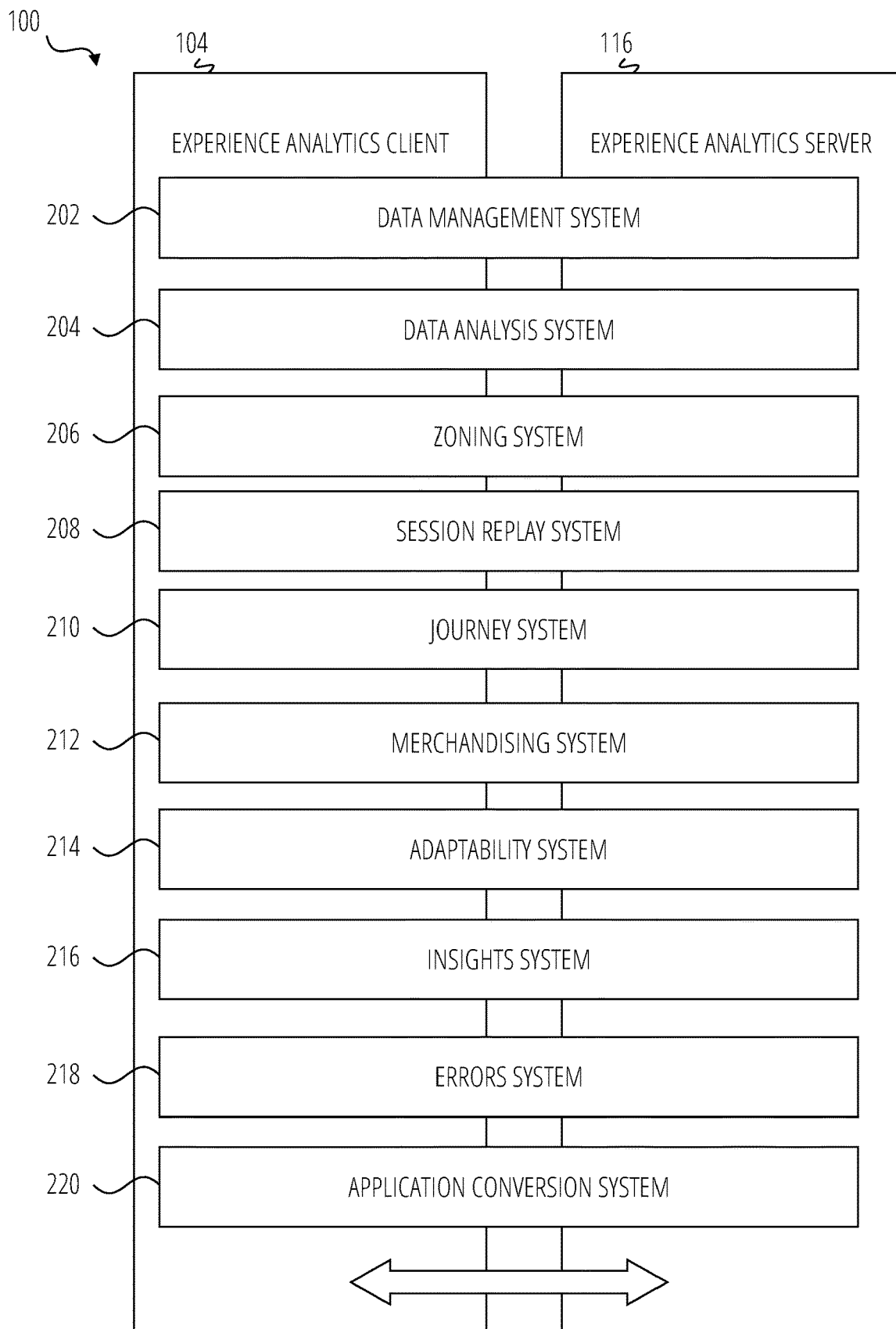
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations, or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

In another example, the insights system 216 generates the frustration scores using the data from the data management system 202. The frustration scores can include a frustration score associated with a given page view within a website (e.g., page view scores), a frustration score associated with a given webpage within a website (e.g., webpage (URL) scores), a frustration score associated with one user's session navigating through a plurality of webpages within the website (e.g., session score), a frustration score associated with a given flow through the plurality of webpages within the website (e.g., flow score), and a frustration score associated with website (e.g., website score). Based on the identified frustration scores, the insights system 216 can also identify and display the session experience indicators, page view experience indicators and zone experience indicators using the data from the data management system 202.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
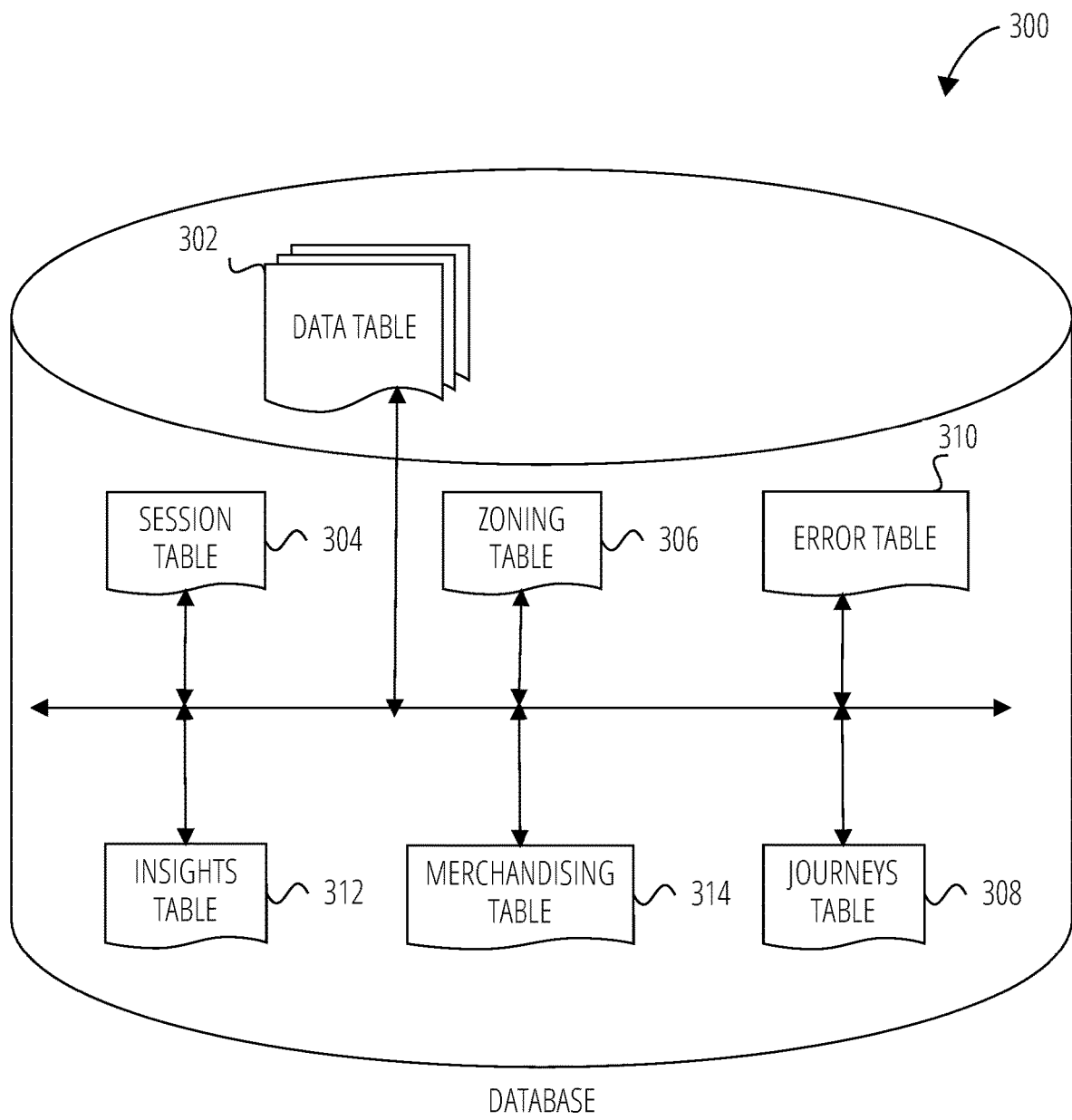
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications. The session replays comprise visualizations of interactions by the users with the website during each of the sessions. A session, for example, can start when a user enters into the website and can end when the user exits from the website.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights system 216. For example, the insights table 312 can store frustration scores that are generated at the end of each session. The insights table 312 can also store flow scores, page view scores, average page view scores, session scores, and website scores. The insights table 312 can store session experience indicators, page view experience indicators and zone experience indicators. Session experience indicators include looping behavior which is identified when a user viewed the same webpage during a session multiple times (e.g., exceeds a predetermined number of visits). Session experience indicators can also include a view consumption ratio which is based on the proportion of the webpages viewed by a user during a session for less than a predetermined minimum time threshold (e.g., less than 2 seconds). Weights can also be stored in the insights table 312 and associated with each of the session experience indicators in the computation of the session score. Page view experience indicators and zone experience indicators can include a rage click which can be a predetermined number of repeated clicks in less than a minimum threshold of time (e.g., 3 repeated clicks in less than two seconds), a predetermined number of repeated interactions with an element, a field, or a button displayed on the webpages (e.g., more than 3-5 interactions), no clicks on one of the plurality of webpages displayed, a cursor hovering more than a predetermined number of times over an element of a webpage (e.g., more than 5 hovers over the same element), an error displayed during the session (e.g., any JavaScript error), detecting that the error is displayed after a click (e.g., less than 2 seconds after the click), a loading time (e.g., 2-7 seconds), etc. The insights table 312 can also store predetermined maximum values for each of the page view experience indicators and zone experience indicators. The insights table 312 can store aggregated frustrations scores for a number of users from which an insight can be generated and stored. For example, if a significant number of users are shown to experience a high level of frustration on the checkout webpage, an insight can be generated (e.g., check out page bugs causing frustration and loss of conversion).

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Frustration Score Generator

Figure 4:
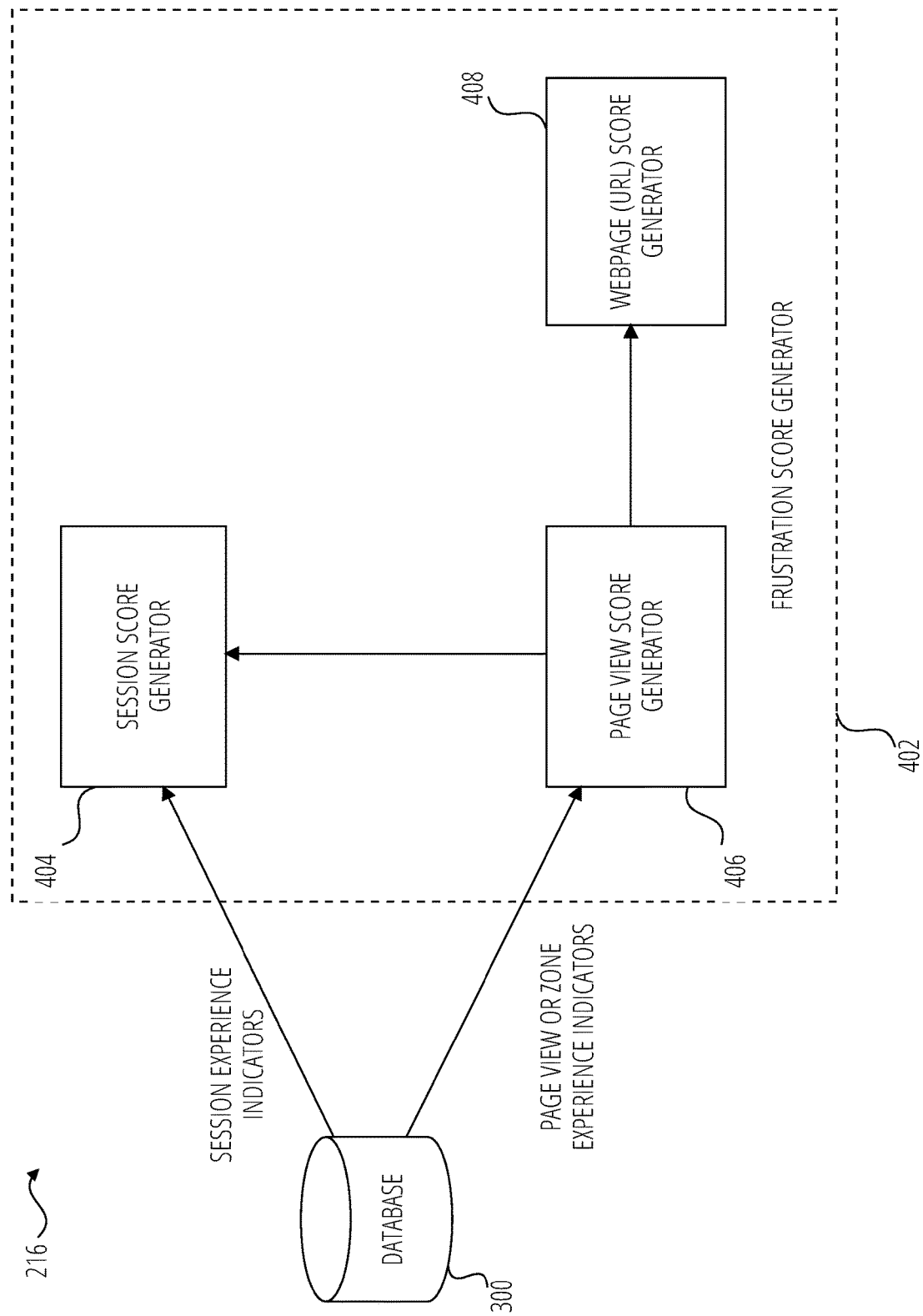
FIG. 4 is a diagrammatic representation of the details of the insights system in accordance with one embodiment.

FIG. 4 is a diagrammatic representation of the details of the insights system 216 in accordance with one embodiment.

The insights system 216 can include a frustration score generator 402 that receives from the insights table 312 of the database 300 the session experience indicators and the page view experience indicators and zone experience indicators, as shown in FIG. 4. The frustration score generator 402 can include a session score generator 404, a page view score generator 406, and a webpage (URL) score generator 408.

The page view score generator 406 generates page view scores based on the page view experience indicators and zone experience indicators stored in the database 300. The page view experience indicators and zone experience indicators can include rage clicks, multiple interactions with a button, field or element on the webpage, low activity (e.g., no click on a webpage), excessive hovers over the same element, errors after a click, errors displayed during the session, loading time, etc. For each of the page view experience indicators and zone experience indicators, the page view score generator 406 can scale an indicator value associated therewith to generate a scaled indicator value.

In one example, for each webpage in the website, the page view score generator 406 can generate page view scores. The page view score generator 406 can aggregate the indicator values (or the scaled indicator values) to generate the page view scores. For example, the page view score generator 406 can compute the sum of the indicator values (or the scaled indicator values). In order to cap the value of each of the indicators, the page view score generator 406 can determine, for each indicator value, whether the indicator value is greater than a maximum value associated with the indicator value and replaces the indicator value that exceeds the maximum value with the maximum value associated with the indicator value prior to computing the sum of the indicator values. In one example, the page view score generator 406 normalizes the page view scores by dividing the sum of the indicator values by a sum of the maximum values associated with each of the indicator values.

In one example, the frustration score generator 402 can also receive context data from the database 300 and other systems in the experience analytics system 100. For example, the zoning system 206 can provide context data regarding the types of zones related to user activity data which further inform whether a user's interaction or behavior with the webpage is expected. For example, based on the context data, a zoning system 206 can indicate that area being clicked repeatedly within a short time frame is not an indication of frustrated users but rather that the area, based on the context data, is identified as being associated with a presentation where clicking moves through the pages of the presentation. Accordingly, this zoning context data would inform the frustration score generator 402 of the insights systems 216 that this behavior is not a rage click but rather an expected behavior. Using context data from the different systems in the experience analytics system 100, the frustration score generator 402 can reduce the false positives (e.g., indications of high frustration).

The session score generator 404 generates session scores based on the page view scores and session experience indicators. The session score generator 404 can aggregate the page view scores and the session experience indicators to generate the session scores. For example, the session scores can be based on an average of the plurality of page view scores. The session scores can also comprise an average or a sum of the average of the plurality of page view scores and the session experience indicators such as the proportion of the same webpages (e.g., Uniform Resource Locators (URLs)) visited during the session (e.g., looping behavior) and the proportion of page views that were viewed by a user for less than a predetermined minimum amount of time (e.g., views consumption). In one example, weights are associated with the looping behavior, the views consumption, and the average of the plurality of page view scores in the computation of the session scores.

While not shown in FIG. 4, the frustration score generator 402 can further include a flow score generator that generates a frustration score associated a specific flow through the webpages of the website. For example, a flow can include the pages navigated to reach a specified page such as the checkout page. In this example, one user's flow can include a navigation through webpages (e.g., pages 1, 2 and 3) through the website to reach the checkout page. The flow score generator can receive the page view scores for each of the pages (e.g., pages 1, 2, 3 and the checkout page) and generate a score associated with this flow. The flow score generator may generate a score that is an aggregation of the page view scores associated with pages 1, 2, and 3. For example, the flow score generator may generate a flow score that is a sum or an average of the page view scores associated with pages 1, 2, and 3. The flow score generator can also aggregate the flow scores for a plurality of users that navigated through this flow (e.g., pages 1, 2, 3 and the checkout page) to generate the flow score associated with a given flow for all the users.

The webpage (URL) score generator 408 generates, for each webpage, a webpage score based on an aggregation of the page view scores associated with the webpage (e.g., or URL) and can generate a frustration score associated with website (e.g., website score) by aggregating the webpage scores of each webpage in the website. In one example, the webpage (URL) score generator 408 generates, for each webpage, a webpage score based on the average of the page view scores associated with the webpage (e.g., or URL). Similarly, the webpage (URL) score generator 408 can also generate a frustration score associated with website (e.g., website score) comprising the average of the webpage scores of each webpage in the website. In one example, the session scores, the page view scores, and the webpage score are on a scale of 0 to 100, where 0 indicates low frustration levels, and 100 indicates high frustration levels.

Process of Generating Frustration Scores for Each User

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 5:
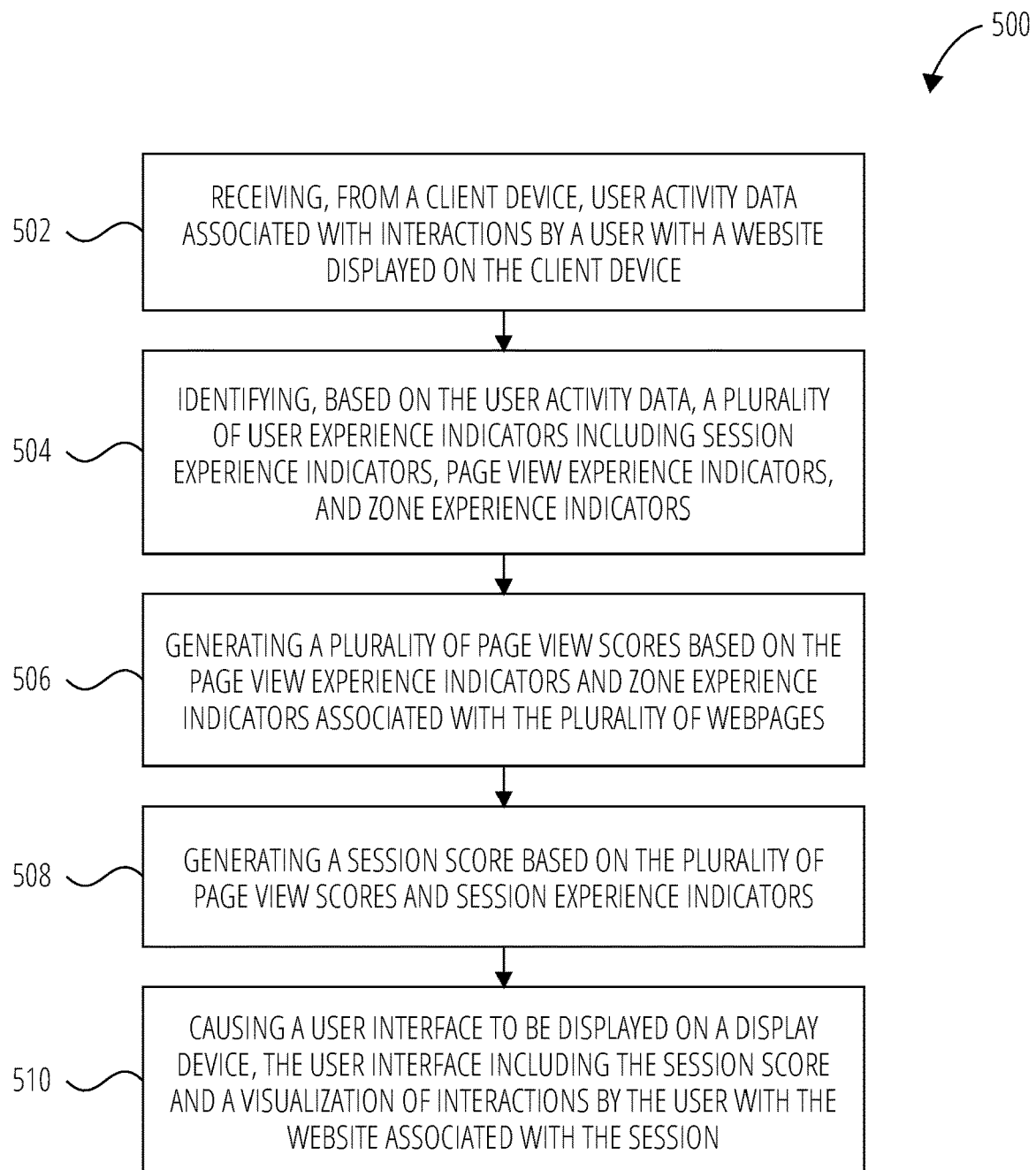
FIG. 5 illustrates a process 500 of generating frustration scores in accordance with one embodiment.

For each user that visits a website, frustrations scores at a page view level (e.g., page view scores) and at a session level (e.g., session score) can be generated to provide a granular understanding of the user's level of frustration with the website. FIG. 5 illustrates a process 500 of generating frustration scores for a single user in accordance with one embodiment. The process 500 can be performed by a processor included in the insights system 216, in any system in the experience analytics system 100, or any combination thereof.

In operation 502, a processor receives from a client device the user activity data associated with interactions by a user with a website displayed on the client device. The website includes a plurality of webpages displayed to the user during a session. The session can start when the user enters the website and can end when the user exits the website. The session can also end when the user is not active for a predetermined period of time (e.g., 30 minutes).

The user activity data can comprises changes in an interface of the website displayed on the plurality of client devices, elements on the website displayed or visible on the interface displayed on the plurality of client devices, text inputs by the users into the website displayed on the plurality of client devices, a movement of cursor of a mouse, touchpad or touch screen, a click or activation of the mouse, the touchpad or the touch screen on the interface of the website, or any combination thereof.

In operation 504, the processor identifies, based on the user activity data, a plurality of user experience indicators including session experience indicators, page view experience indicators, and zone experience indicators.

In one example, the processor identifying the session experience indicators comprises the processor identifying a looping behavior by identifying that a number of times that the user viewed a same webpage exceeds a predetermined visit threshold. In another example, the processor identifying the session experience indicators comprises the processor identifying a proportion of the webpages that is viewed for less than a predetermined minimum time threshold.

The processor identifying the page view experience indicators and the zone experience indicators can comprise the processor detecting a rage click comprising a predetermined number of repeated clicks in less than a minimum threshold of time, detecting a predetermined number of repeated interactions with an element, a field, or a button displayed on the webpages, detecting no clicks on one of the plurality of webpages displayed, detecting that a cursor is hovering more than a predetermined number of times over an element of one of the plurality of webpages, detecting an error is displayed during the session, detecting that the error is displayed or triggered after a click, detecting a loading time that exceeds a predetermined amount of time, or any combination thereof.

In operation 506, the processor generates a plurality of page view scores based on the page view experience indicators and zone experience indicators associated with the plurality of webpages. Each of the page view scores indicates a level of frustration that the user has experienced with each of the webpages, respectively.

In operation 508, the processor generates a session score based on the plurality of page view scores and session experience indicators. The session score indicates a level of frustration that the user has experienced with the website.

In operation 510, the processor causes a user interface to be displayed on a display device. The user interface can include the session score and a visualization of interactions by the user with the website associated with the session. The processor can generate the visualization of interactions by the user with the website based on the user activity data associated with the user. For example, the member client device can comprise the display device such that the viewer of the display device is an agent of the client (e.g., a web administrator, an employee, etc.). The member client device 102 can also separate but coupled to the display device.

Process of Generating Frustration Scores Based on a Plurality of Users

For each website, frustration scores can be generated for a plurality of users that have visited the website. Using each of the user's frustration score, the experience analytics system 100 can surface the sessions or page views that have the highest levels of frustration for analysis and corrections (e.g., bug fixes, user experience (UX) redesign, etc.) as well as to monitor the evolution of the frustration scores and spot problematic webpages quickly.

Figure 6:
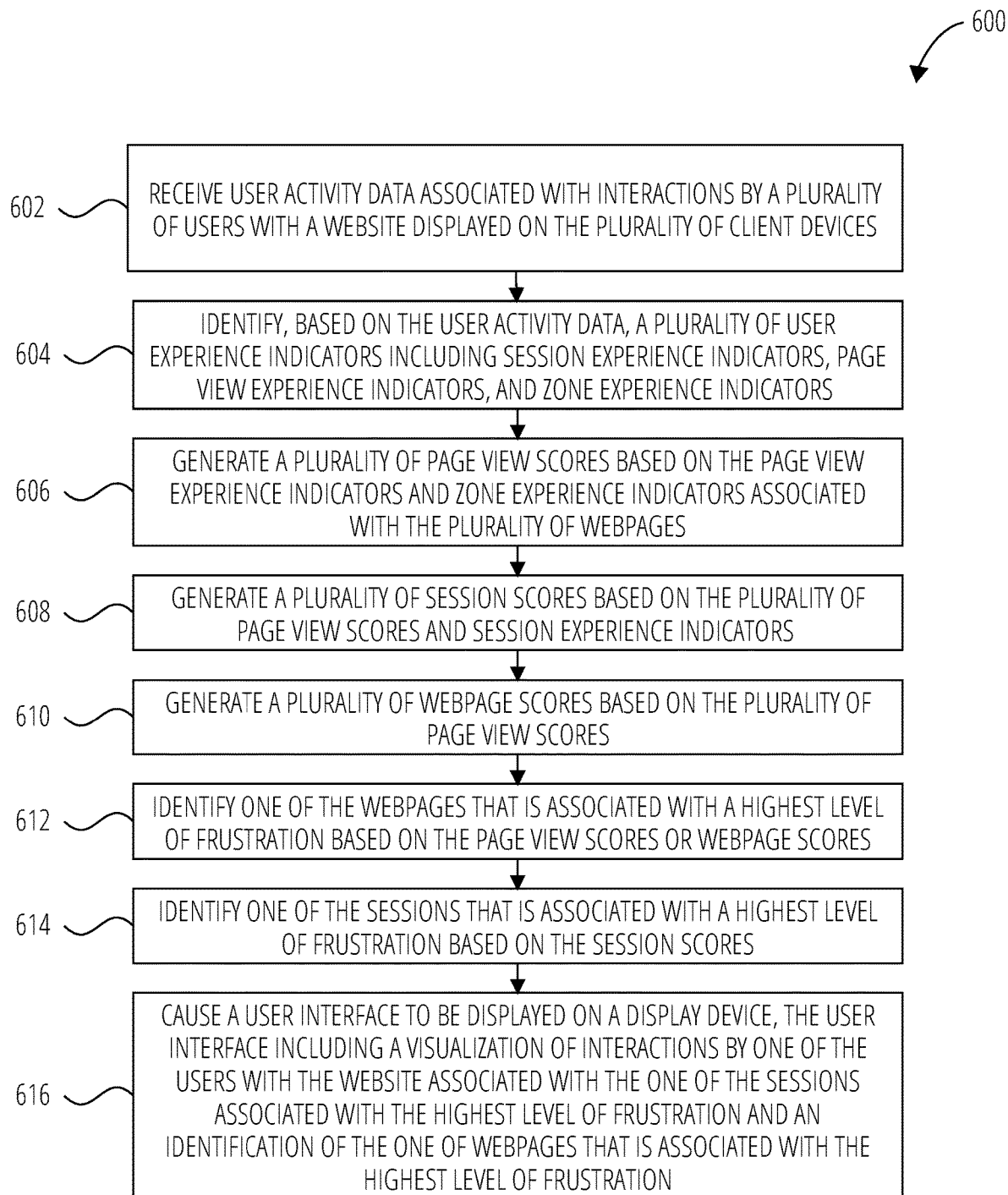
FIG. 6 illustrates a process 600 of generating frustration scores in accordance with one embodiment.

FIG. 6 illustrates a process 600 of generating frustration scores in accordance with one embodiment. The process 600 can be performed by a processor included in the insights system 216, in any system in the experience analytics system 100, or any combination thereof.

In operation 602, the processor receives from a plurality of client devices user activity data associated with interactions by a plurality of users with a website displayed on the plurality of client devices. For example, the user activity data comprises changes in an interface of the website displayed on the plurality of client devices, elements on the website displayed or visible on the interface displayed on the plurality of client devices, text inputs by the users into the website displayed on the plurality of client devices, a movement of cursor of a mouse, touchpad or touch screen, a click or activation of the mouse, the touchpad or the touch screen on the interface of the website, or any combination thereof.

The website can comprise a plurality of webpages displayed during a plurality of sessions. Each of the plurality of sessions comprises a timeframe between an entry by a user of the plurality of users into the website and an exit by the user from the website. For example, a session can start when a user enters a website and can end when the user exits the website.

In operation 604, the processor identifies, based on the user activity data, a plurality of user experience indicators including session experience indicators, page view experience indicators, and zone experience indicators.

In one example, the processor identifying the session experience indicators comprises the processor identifying a looping behavior by identifying that a number of times that the user viewed a same webpage exceeds a predetermined visit threshold. In another example, the processor identifying the session experience indicators comprises the processor identifying a proportion of the webpages that is viewed for less than a predetermined minimum time threshold.

The processor identifying the page view experience indicators and the zone experience indicators can comprise the processor detecting a rage click comprising a predetermined number of repeated clicks in less than a minimum threshold of time, detecting a predetermined number of repeated interactions with an element, a field, or a button displayed on the webpages, detecting no clicks on one of the plurality of webpages displayed, detecting that a cursor is hovering more than a predetermined number of times over an element of one of the plurality of webpages, detecting an error is displayed during the session, detecting that the error is displayed after a click, detecting a loading time that exceeds a predetermined amount of time, or any combination thereof.

In operation 606, the processor generates a plurality of page view scores based on the page view experience indicators and zone experience indicators associated with the plurality of webpages. In one example, the processor generates the plurality of page view scores by generating a plurality of indicator values for the page view experience indicators and zone experience indicators, and adding each of the indicator values to generate a sum of the indicator values. The processor can also cap the indicator values by determining that one of the indicator values is greater than a maximum value associated with the one of the indicator values, and replacing the one of indicator values with the maximum value prior to adding each of the indicator values to generate a sum of the indicator values. To generate the page view scores, the processor can also normalize the indicator values by dividing the sum of the indicator values by a sum of maximum values associated with each of the indicator values. Each of the page view scores can be associated with a single user's user activity data on the associated webpage. In one example, the processor can also scale the indicator values to generate scaled indicator values and use the scaled indicator values to generate the page view scores.

In operation 608, the processor generates a plurality of session scores based on the plurality of page view scores and session experience indicators. Each of the session scores can be associated with a single user's user activity data during the user's session. For example, the session scores can comprise an average of the plurality of page view scores within the sessions. For example, a given session score can be an average of each of the page view scores generated for that session. The session experience indicators can include the looping behavior and the views consumption. In one example, the session scores can comprise an average of the plurality of page view scores and the session experience indicators such as the proportion of the same webpages (e.g., Uniform Resource Locators (URLs)) visited during the session (e.g., looping behavior) and the proportion of page views that were viewed by a user for less than a predetermined minimum amount of time (e.g., views consumption). In one example, weights are associated with the looping behavior, the views consumption, and the average of the plurality of page view scores in the computation of the session scores.

In operation 610, the processor generates a plurality of webpage scores based on the plurality of page view scores. The webpage scores can comprise the average of page view scores associated with the webpages. For example, for each webpage, a webpage score can be based on the average of the page view scores associated with that webpage (e.g., or URL).

In operation 612, the processor identifies one of the webpages that is associated with a highest level of frustration based on the page view scores or webpage scores. In operation 614, the processor identifies one of the sessions that is associated with a highest level of frustration based on the session scores. In one example, the session scores, the page view scores, and the webpage score are on a scale of 0 to 100, where 0 indicates low frustration levels, and 100 indicates high frustration levels.

In operation 616, the processor causes a user interface to be displayed on a display device. The user interface can include a visualization of interactions by one of the users with the website associated with the one of the sessions associated with the highest level of frustration and an identification of the one of webpages that is associated with the highest level of frustration. The processor can generate the visualization of interactions by one of the users with the website based on the user activity data associated with the one of the users. For example, the user interface can show at least one session replay that is associated with the highest level of frustration in order to view and identify the website elements that are causing frictions. The user interface can also include a selectable element (e.g., link, text, icon, image) that can be selected by a viewer of the display device to cause the at least one session replay to be viewed. The processor can identify the page views and session replays that are associated with the highest level of frustration.

In one example, the processor can cause a list of the sessions associated with different users to be included in the user interface for a given website. The list of sessions can also include the session scores for each session. The list of sessions can be organized based on the session scores. For instance, the session having the highest session score which indicates the highest level of frustration experienced by a user on the website can be at the top of the list in order to highlight this problematic session for review. For each session in the list of session, the user interface can also include the selectable element (e.g., link, text, icon, image) that can be selected by a viewer of the display device to cause the session replay associated with each of the sessions to be viewed. For each session, the user interface can also include the experience indicators that are found in each of the session and data associated with the experience indicators. For example, the user interface can include a number of rage clicks and the time spent by the user hovering over an element in the session replay of this session. The user interface can also include a date range input that allows the viewer to indicate a date range (e.g., last 7 days, last month, etc.) in order to filter the sessions to be included in the list of sessions. For example, if the viewer selects the last 7 days as a date range, the list of the sessions included in the user interface would comprise the user's sessions on the website that occurred in the last 7 days.

In another example, the user interface can also include a selectable item (e.g., a drop down list) or a text input (e.g., text box) that allows the viewer to request a list of sessions or a list of page views of a given webpage in the website. For example, the viewer can request a list of page views associated with the checkout webpage of the website. In this example, the processor can cause a list of the page views associated with different users to be included in the user interface for the webpage (e.g., the checkout page). The list of page views can also include the page view scores for each page view. The list of page views can be organized based on the page view scores. For instance, the page view having the highest page view score which indicates the highest level of frustration experienced by a user on the webpage (e.g., the checkout page) can be at the top of the list in order to highlight this problematic session replay of the webpage for review. For each page view in the list of page views, the user interface can also include the selectable element (e.g., link, text, icon, image) that can be selected by a viewer of the display device to cause the session replay associated with each of the page views to be viewed. For each page view, the user interface can also include the experience indicators that are found in each of the page views and data associated with the experience indicators. The user interface can also include a date range input that allows the viewer to indicate a date range (e.g., last 7 days, last month, etc.) in order to filter the page views to be included in the list of sessions.

The processor can also cause any of the frustration scores (e.g., the session scores, the page view scores, and the webpage score) to be included and displayed in the user interface. Accordingly, using the frustration scores, the viewer of the display device is able to monitor the evolution of the frustration scores and spot problematic webpages quickly.

For example, for a given webpage (e.g., the checkout page), the processor can aggregate the page view scores of different users (e.g., average score, mean score, median score, etc.) and generate a graph indicating the aggregated page view score for a given webpage (e.g., checkout page) over a period time. The user interface that is displayed to the viewer on the display device can further include this graph so the viewer can monitor the evolution of the webpage's aggregated page view score. The viewer can further select the period of time for the graph via the date rage input. For example, the member client device can comprise the display device such that the viewer of the display device is an agent of the client (e.g., a web administrator, an employee, etc.). The member client device 102 can also separate but coupled to the display device.

In other examples, the processor can aggregate other frustration scores (e.g., session scores and webpage scores) in order generate a graph indicating these aggregated frustration scores over a period of time.

Embodiments of the disclosure illustrate improvements made to the functionality of digital experience tracking systems by generating frustration scores that can be obtained and applied to any level of granularity (e.g., page view, session, webpage (URL), website, zones in the webpage, etc.).

Machine Architecture

Figure 7:
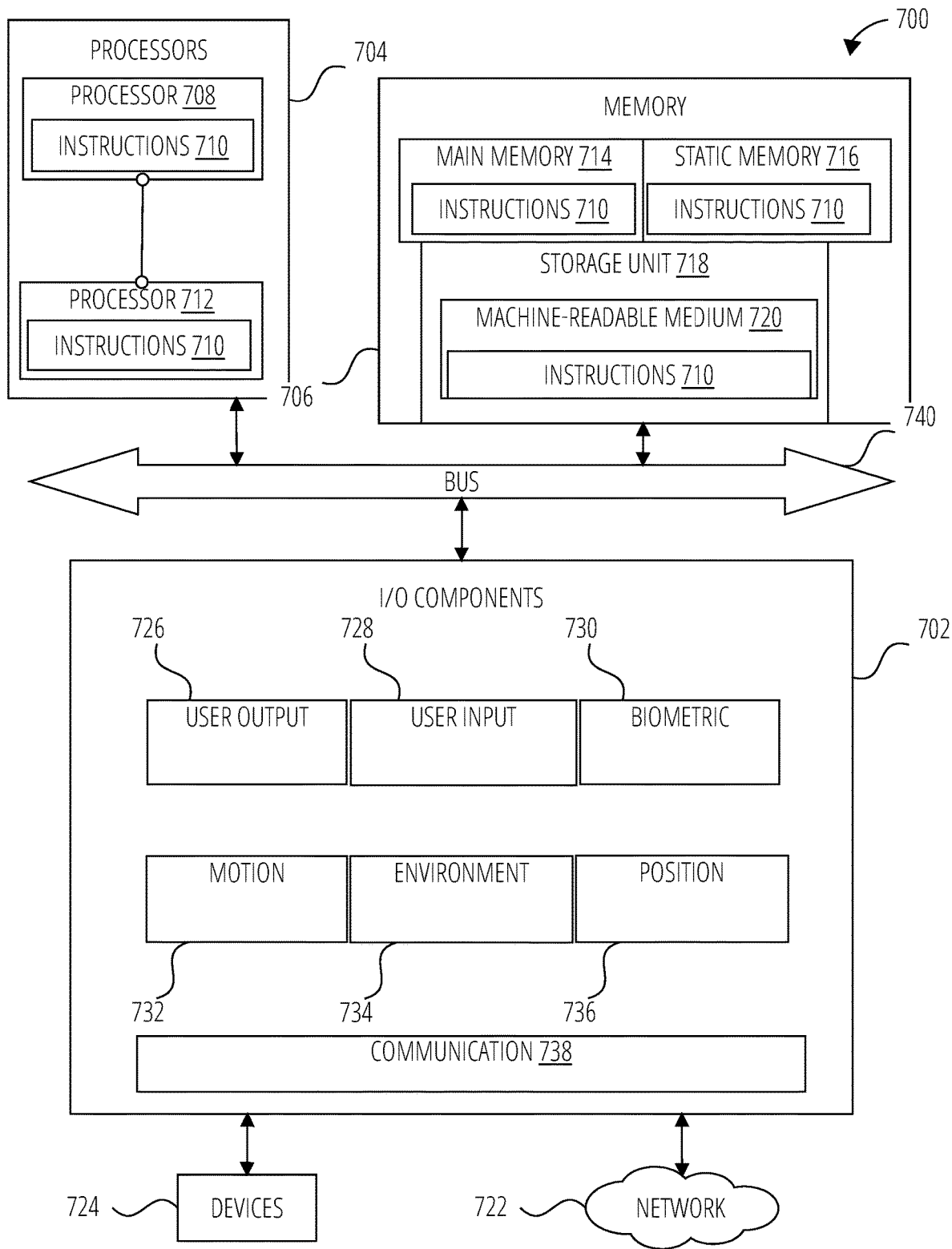
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an application, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the member client device 102 or any one of a number of server devices forming part of the experience analytics server 116. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera, and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
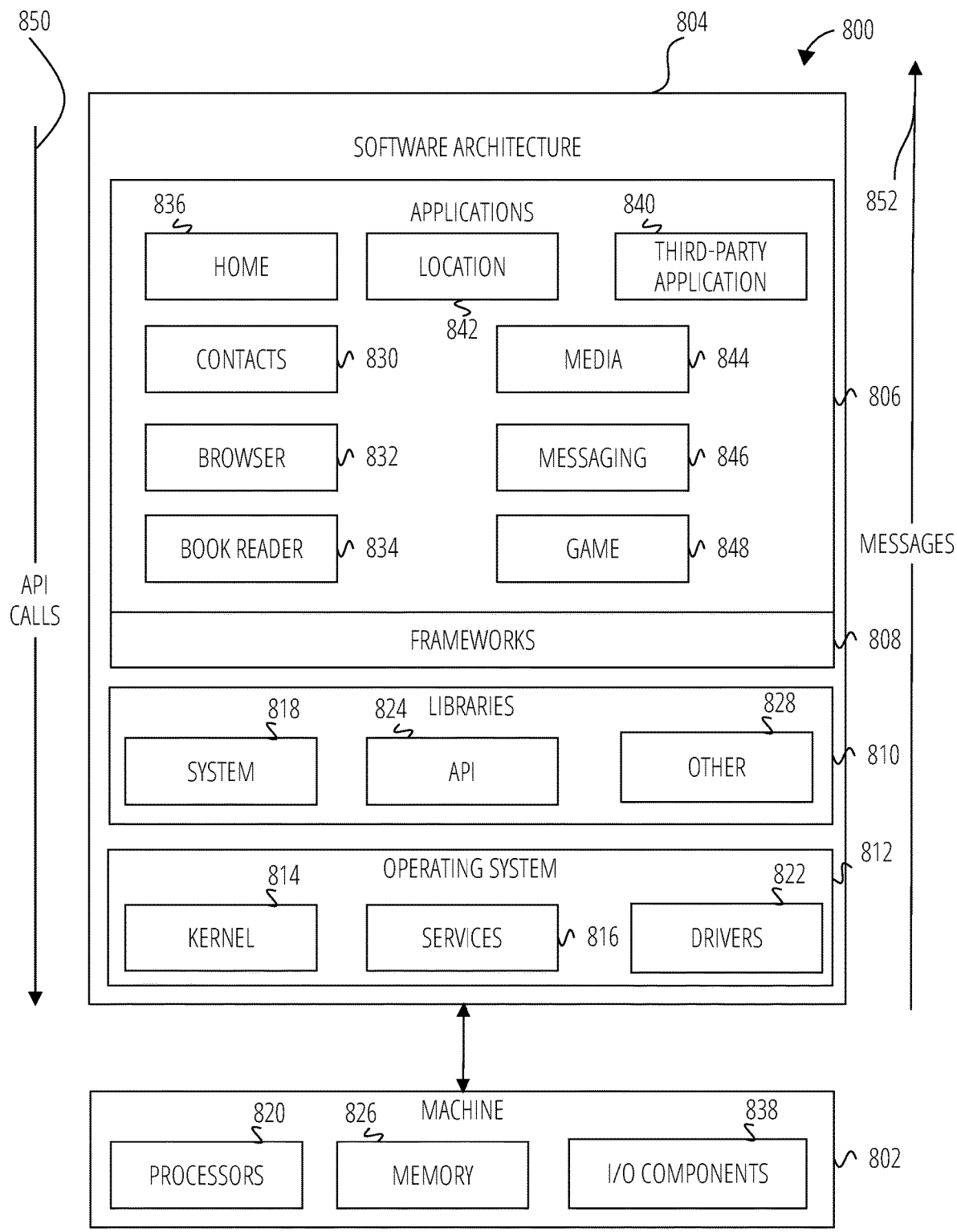
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    receiving, by a processor from a plurality of client devices, user activity data associated with interactions by a plurality of users with a website displayed on the plurality of client devices, wherein the website comprises a plurality of webpages displayed during a plurality of sessions;
    identifying, based on the user activity data, a plurality of user experience indicators including a plurality of session experience indicators, a plurality of page view experience indicators, and a plurality of zone experience indicators;
    identifying one of the webpages that is associated with a highest level of frustration based on a plurality of page view scores or a plurality of webpage scores, wherein the page view scores is based on at least one of page view experience indicators or zone experience indicators;
    identifying one of the sessions that is associated with a highest level of frustration based on a plurality of session scores that are based on session experience indicators; and
    causing a user interface to be displayed on a display device, the user interface including a visualization of interactions by one of the users with the website associated with the one of the sessions associated with the highest level of frustration and an identification of the one of webpages that is associated with the highest level of frustration, wherein the visualization of interactions by one of the users with the website comprises a session replay associated with the highest level of frustration that is generated based on the user activity data.

2. The method of claim 1, wherein generating the plurality of page view scores further comprises:
generating a plurality of indicator values for the page view experience indicators and the zone experience indicators; and
adding each of the indicator values to generate a sum of the indicator values.

3. The method of claim 2, wherein generating the plurality of page view scores further comprises:
determining that one of the indicator values is greater than a maximum value associated with the one of the indicator values; and
replacing the one of indicator values with the maximum value.

4. The method of claim 2, wherein generating the plurality of page view scores further comprises:
dividing the sum of the indicator values by a sum of maximum values associated with each of the indicator values.

5. The method of claim 1, wherein each of the plurality of sessions comprises a timeframe between an entry by a user of the plurality of users into the website and an exit by the user from the web site.

6. The method of claim 1, wherein identifying the session experience indicators comprises identifying a looping behavior by identifying that a number of times that the user viewed a same webpage of the plurality of webpages exceeds a predetermined visit threshold.

7. The method of claim 1, wherein identifying the session experience indicators comprises identifying a proportion of the webpages viewed for less than a predetermined minimum time threshold.

8. The method of claim 1, wherein identifying the page view experience indicators and the zone experience indicators comprises: detecting a rage click comprising a predetermined number of repeated clicks in less than a minimum threshold of time, detecting a predetermined number of repeated interactions with an element, a field, or a button displayed on the webpages, detecting no clicks on one of the plurality of webpages displayed, detecting that a cursor is hovering more than a predetermined number of times over an element of one of the plurality of webpages, detecting an error is displayed during the session, detecting that the error is displayed after a click, or any combination thereof.

9. The method of claim 1, wherein generating the session scores is further based on an average of the plurality of page view scores.

10. The method of claim 9, wherein generating the webpage scores is further based on the average of page view scores associated with the webpage.

11. The method of claim 1, wherein the user activity data comprises changes in an interface of the website displayed on the plurality of client devices, elements on the website displayed or visible on the interface displayed on the plurality of client devices, text inputs by the users into the website displayed on the plurality of client devices, a movement of cursor of a mouse, touchpad or touch screen, a click or activation of the mouse, the touchpad or the touch screen on the interface of the website, or any combination thereof.

12. A system comprising:
a processor; and
a memory storing instructions that, when executed by the processor, cause the system to perform operations comprising:
receiving, from a plurality of client devices, user activity data associated with interactions by a plurality of users with a website displayed on the plurality of client devices, wherein the website comprises a plurality of webpages displayed during a plurality of sessions;
identifying, based on the user activity data, a plurality of user experience indicators including a plurality of session experience indicators, a plurality of page view experience indicators, and a plurality of zone experience indicators;
identifying one of the webpages that is associated with a highest level of frustration based on a plurality of page view scores or a plurality of webpage scores, wherein the page view scores is based on at least one of page view experience indicators or zone experience indicators;
identifying one of the sessions that is associated with a highest level of frustration based on a plurality of session scores that are based on session experience indicators; and
causing a user interface to be displayed on a display device, the user interface including a visualization of interactions by one of the users with the website associated with the one of the sessions associated with the highest level of frustration and an identification of the one of webpages that is associated with the highest level of frustration, wherein the visualization of interactions by one of the users with the website comprises a session replay associated with the highest level of frustration that is generated based on the user activity data.

13. The system of claim 12, wherein generating the plurality of page view scores further comprises:
generating a plurality of indicator values for the page view experience indicators and the zone experience indicators; and
adding each of the indicator values to generate a sum of the indicator values.

14. The system of claim 13, wherein generating the plurality of page view scores further comprises:
determining that one of the indicator values is greater than a maximum value associated with the one of the indicator values; and
replacing the one of indicator values with the maximum value.

15. The system of claim 13, wherein generating the plurality of page view scores further comprises:
dividing the sum of the indicator values by a sum of maximum values associated with each of the indicator values.

16. The system of claim 12, wherein each of the plurality of sessions comprises a timeframe between an entry by a user of the plurality of users into the website and an exit by the user from the web site.

17. The system of claim 12, wherein generating the session scores is further based on an average of the plurality of page view scores.

18. The system of claim 17, wherein generating the webpage scores is further based on the average of page view scores associated with the webpage.

19. The system of claim 12, wherein identifying the page view experience indicators and the zone experience indicators comprises: detecting a rage click comprising a predetermined number of repeated clicks in less than a minimum threshold of time, detecting a predetermined number of repeated interactions with an element, a field, or a button displayed on the webpages, detecting no clicks on one of the plurality of webpages displayed, detecting that a cursor is hovering more than a predetermined number of times over an element of one of the plurality of webpages, detecting an error is displayed during the session, detecting that the error is displayed after a click, or any combination thereof.

20. A non-transitory computer-readable storage medium, the computer-readable storage medium including instructions that when executed by a computer, cause the computer to perform operations comprising:
- receiving, from a plurality of client devices, user activity data associated with interactions by a plurality of users with a website displayed on the plurality of client devices, wherein the website comprises a plurality of webpages displayed during a plurality of sessions;
- identifying, based on the user activity data, a plurality of user experience indicators including session experience indicators, a plurality of page view experience indicators, and a plurality of zone experience indicators;
- identifying one of the webpages that is associated with a highest level of frustration based on a plurality of page view scores or a plurality of webpage scores, wherein the page view scores is based on at least one of page view experience indicators or zone experience indicators;
- identifying one of the sessions that is associated with a highest level of frustration based on a plurality of session scores that are based on session experience indicators; and causing a user interface to be displayed on a display device, the user interface including a visualization of interactions by one of the users with the website associated with the one of the sessions associated with the highest level of frustration and an identification of the one of webpages that is associated with the highest level of frustration, wherein the visualization of interactions by one of the users with the website comprises a session replay associated with the highest level of frustration that is generated based on the user activity data.

* * * * *

UNITED STATES PATENT AND TRADEMARK OFFICE
CERTIFICATE OF CORRECTION

| | | |
|---|---|---|
| PATENT NO. | : 11,954,171 B2 | Page 1 of 1 |
| APPLICATION NO. | : 18/387374 | |
| DATED | : April 9, 2024 | |
| INVENTOR(S) | : Colombet et al. | |

It is certified that error appears in the above-identified patent and that said Letters Patent is hereby corrected as shown below:

On the Title Page

Under item (56) "References Cited", in Column 2, Line 4, after "(Continued)", insert
--FOREIGN PATENT DOCUMENTS
WO 2023139527 7/2023--

On page 2, in Column 1, under item (56) "U.S. Patent Documents", Line 10, after "714/37", insert
--11,841,919 12/2023 Colombet, et al.--

In the Specification

In Column 15, Line 38, delete "I/O" and insert --(I/O)-- therefor

In Column 15, Line 60, delete "706," and insert --714,-- therefor

In the Claims

In Column 23, Line 23, in Claim 5, delete "web site." and insert --website.-- therefor In Column 23, Line 52, in Claim 16, delete "web site." and insert --website.-- therefor Signed and Sealed this
Thirty-first Day of December, 2024

Derrick Brent
*Acting Director of the United States Patent and Trademark Office*